United States Patent

[11] 3,610,872

| [72] | Inventor | David Sciaky<br>Chicago, Ill. |
| --- | --- | --- |
| [21] | Appl. No. | 765,366 |
| [22] | Filed | Oct. 7, 1968 |
| [45] | Patented | Oct. 5, 1971 |
| [73] | Assignee | Welding Research, Inc.<br>Chicago, Ill. |

[54] ELECTRON BEAM WELDING MACHINE OF CLAMSHELL CONSTRUCTION
6 Claims, 7 Drawing Figs.

[52] U.S. Cl. ..................... 219/121EB,
219/69, 219/72
[51] Int. Cl. ..................... B23k 15/00
[50] Field of Search ............ 219/121,
72, 121 EB; 220/32, 36; 128/30, 31; 13/31;
118/30; 277/34; 34/92

[56] References Cited
UNITED STATES PATENTS

| 3,475,583 | 10/1969 | Gerlach | 219/121 EB |
| --- | --- | --- | --- |
| 1,699,220 | 1/1929 | Boykin | 34/92 |
| 1,803,665 | 5/1931 | Dennis | 277/34 |
| 2,314,955 | 3/1943 | Slater | 128/30 |
| 2,319,031 | 5/1943 | Baker | 34/92 |
| 2,858,795 | 11/1958 | Walker | 34/92 |
| 3,341,974 | 9/1967 | Ganzinotti | 277/34 |
| 3,408,083 | 10/1968 | Szymanski | 277/34 |
| 3,420,978 | 1/1969 | Webb | 219/121 |
| 643,606 | 2/1900 | Rebbeck | 220/36 |
| 3,485,998 | 12/1969 | Gerard | 219/121 |

OTHER REFERENCES
"Welding Engineer" Dec. 1957. 219/72

*Primary Examiner*—J. V. Truhe
*Assistant Examiner*—Robert O'Neill
*Attorney*—Julius L. Solomon ABSTRACT: This invention relates to electron beam welding machines and, in particular, to an electron beam welding machine of a clamshell configuration. The apparatus of the present invention has particular utility for the electron beam welding of very large structures such as are used in components of the aerospace and aircraft industry. The apparatus comprises a heavily reinforced floor which functions as an immense tooling bed plate and, at the same time, as one wall of the vacuum chamber. A single-piece clamshell structure which is arranged to swing open or shut against the floor by rotation about a pivot is sealed effectively to the floor by means of a continuous seal arranged close to the edges of the floor which seals against the lip of the open side of the clamshell structure. The vacuum chamber formed by the floor and the clamshell is evacuated from below the floor through grilled openings in the floor. The electron beam gun is mounted on a carriage, having several degrees of motion, which itself is mounted on a gentry which, in turn, is mounted on a ball screw mechanism so that the gantry may be transported from one end of the chamber to the other.

INVENTOR
David Sciaky
BY
Julius Solomon

PATENTED OCT 5 1971 3,610,872

INVENTOR
David Sciaky
BY
Julius L. Solomon 3,610,872

ELECTRON BEAM WELDING MACHINE OF CLAMSHELL CONSTRUCTION

This invention relates to electron beam welding apparatus having particular utility for the welding of very large structures which are used as the components in space vehicles and aircraft. These structures are of such shape and so large in size that they are most conveniently handled by overhead cranes. It would not be possible to easily introduce such structures into the electron beam welding chambers of the conventional type which are constructed with ports at the side or front of the chamber. Electron beam welding is a new welding process which utilizes the energy in an electron beam which is directed to the desired weld seam. When the electron beam strikes the material its energy is efficiently transferred to the material and if the power density and power is sufficiently high, the material melts to the full depth desired and then fuses when the beam leaves the spot. In order to weld along a seam, the electron beam is moved with respect to the work, along the seam. The electron beam welding process is normally carried on inside a vacuum chamber which is maintained at a pressure of approximately $10^{14}$ Torr. Heretofore the work pieces that had been welded have been limited to parts several feet in dimension which have been introduced into vacuum chambers through ports on the wall of a rectangular or cylindrical vacuum chamber. The electron gun is usually affixed to a carriage mounted to the top of the chamber and the parts to be welded are mounted on a carriage which moves along ways fixed to the bottom wall of the chamber. In order to provide greater accessibility to the inside of the chamber they have been designed with the doors covering a full wall of the chamber. When this is done, however, the structure is weakened depending upon the size and number of the openings which are provided and consequently when the chamber is evacuated after the parts have been placed in the chamber for welding, it is found that the chamber walls distort and shift their position, one with respect to the other. In order to limit this distortion it has been necessary to construct these chambers of heavy plates stiffened by many thick and wide ribs. The gun being mounted to the top of the chamber and the parts to be welded on the bottom of the chamber, it has been found to be extremely difficult to maintain alignment of the gun with respect to the workpiece from the initial alignment before pumpdown to the condition after pumpdown. Were it necessary to provide a vacuum chamber for the welding of very large parts, for example wing sections which may be 30 to 40 feet long, the problem of maintaining alignment would be well nigh an impossible one and the machine therefore would be useless because of the great difficulty of maintaining parts in alignment.

The present invention has as its aim, the overcoming of the above difficulties and the possibility of providing an electron beam welding machine capable of welding structures 30, 40 and 50 feet long.

It is a further object of this invention to provide an electron beam welding apparatus in which both the workpiece and the electron beam gun are mounted on one wall of the electron beam chamber.

Another object is to provide an electron beam welding machine in which the electron beam gun is carried upon a gantry which is capable of being moved by means of a ball screw mechanism from one end of the chamber to the other.

Another object is to provide an immense tooling bed plate mounted on the same floor surface to which the parts to be welded may be fastened.

Another object is to provide a floor for the vacuum chamber which provides a rigid base, with no appreciable deflection, upon which the tooling and gantry carrying the electron beam gun or guns may be mounted.

Another object is to provide an electron beam welding machine in which there is no relative displacement, between the electron beam gun and the parts being welded, which results from the evacuation of the chamber.

Another object of this invention is to provide a machine in which all the tooling and the gantry carrying the electron beam gun are completely exposed so that the large structure to be welded may easily be mounted to the part-holding carriage.

Another object is to provide an electron beam welding machine in which all the tooling and equipment necessary to hold the parts to be welded and to move the parts with respect to the gun are completely accessible on all sides.

Another object is to provide a vacuum chamber which can be opened in clamshell fashion in order to completely expose the fixturing.

The above objects and others may be achieved by an apparatus having certain novel features of construction and operation as will be more fully described and particularly pointed out in the specification, drawings and claims appended thereto.

Figure 5B:
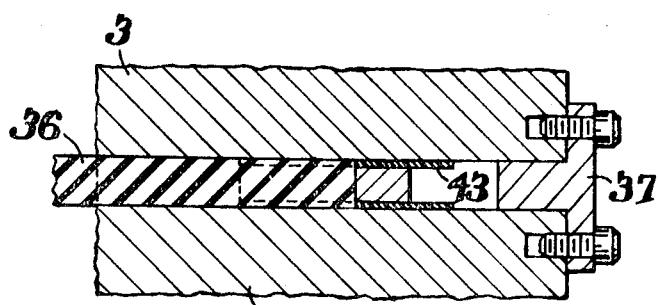
Figure 5A:
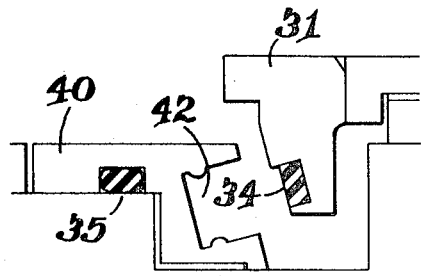
Figure 5:
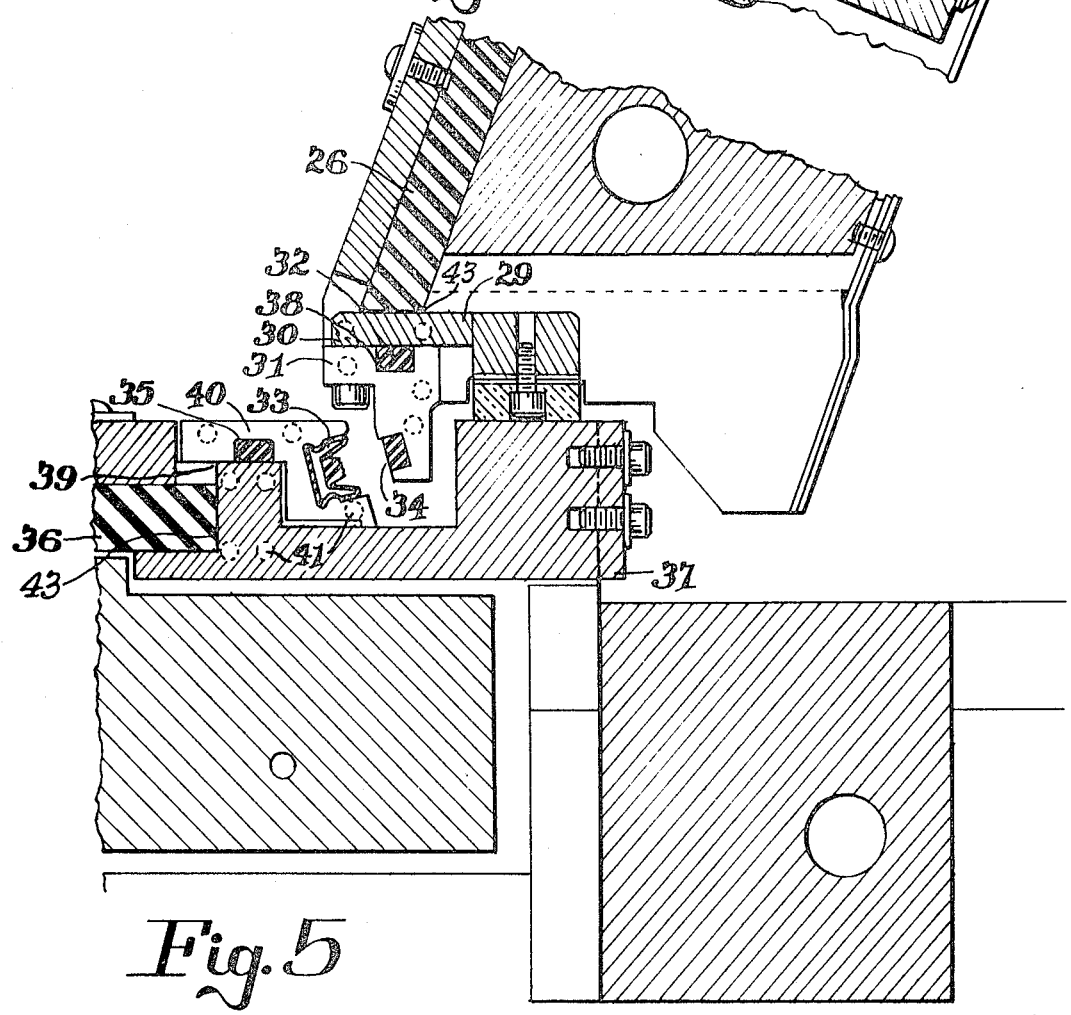

FIGS. 5, 5a, and 5b are sectional details of the apparatus used for sealing the clamshell structure to the floor plate.

Figure 1:
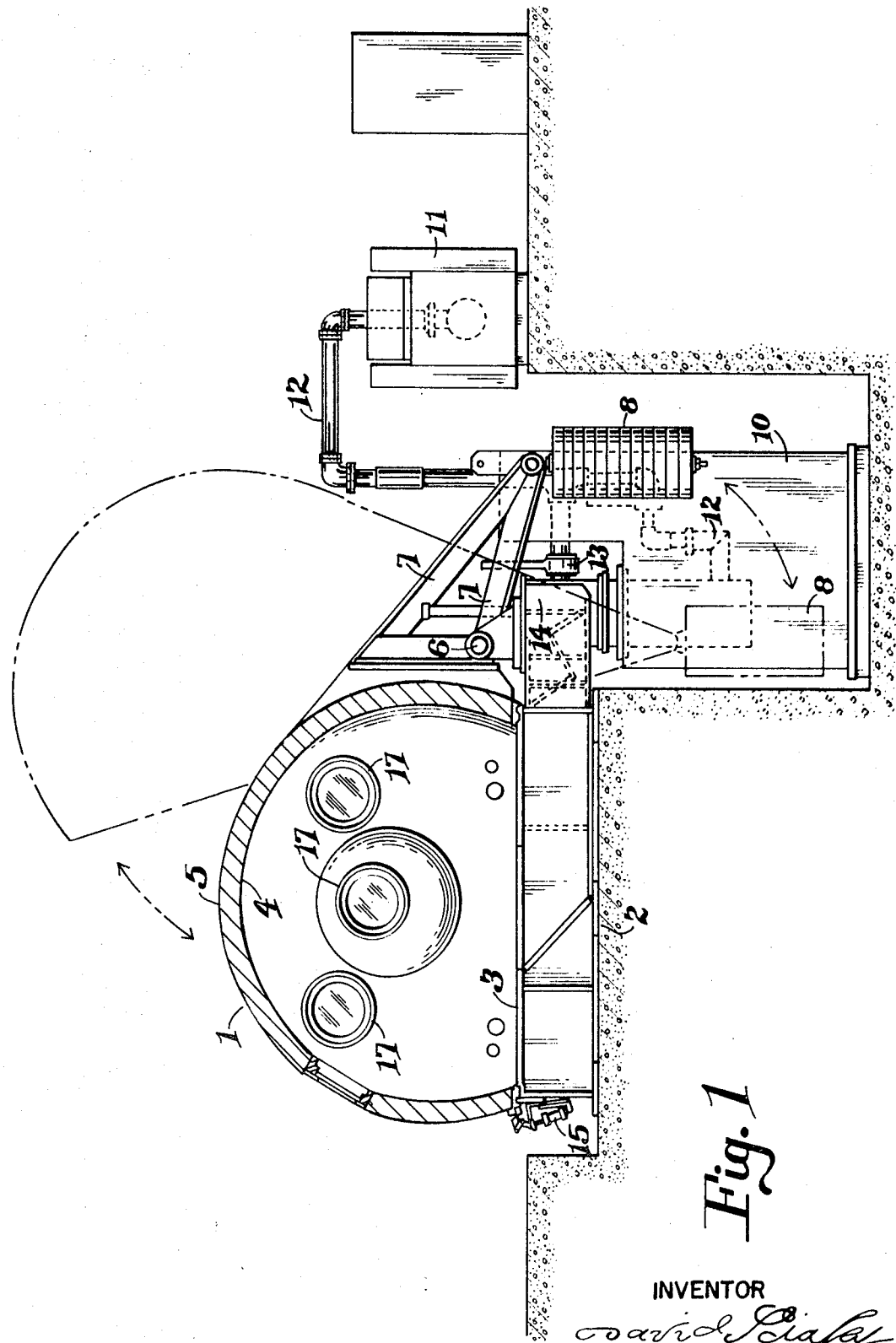
FIG. 1 is a section of the side view of one form of the invention.

FIG. 1 is a side view of the electron beam vacuum chamber and associated equipment as viewed from a section made at the center of the chamber. The vacuum chamber consists of a base section 2 and a clamshell section 1 which is arranged to mate with the floor plate 3 of the base section so as to effectively seal the enclosed space bounded by the inner surface of the clamshell and the floor plate 3. The clamshell is constructed of plates 4 which have been rolled to the proper contour and stiffening members 5 which are welded to the plates. The clamshell structure is pivoted about bearings 6 and its supporting structure 7 is fitted with counter weights 8. The open position of the clamshell and counterweights is outlined in broken lines. The base section 2 includes the rigid floor plate 3 which is heavily ribbed and reinforced so that the floor plate does not distort under the action of the difference between the atmospheric pressure on the outside and the vacuum condition within the chamber and its surface therefore is maintained essentially flat and in perfect alignment both before and after pump down. The base section 2 is constructed so as to include a plenum chamber 9 directly below the base plate 3. The plenum chamber has access to the vacuum chamber through grill covered openings in the floor plate. The plenum chamber and vacuum chamber are evacuated by the action of the diffusion pump 10 which is backed up by a mechanical pump 11 to which the foreline 12 of the diffusion pump 10 is connected by means of pipes 12. A bypass valve 13 is connected between the plenum chamber 9 and the mechanical pump 11 so that when open the plenum chamber and vacuum chamber may be rough pumped down to the pressure at which the diffusion pump becomes effective. A vacuum valve 14 is situated between the plenum chamber and diffusion pump for use in sealing off the diffusion pump during the roughing down period. In the operation of the clamshell enclosure from its open position the clamshell is caused to rotate in the counterclockwise direction by means of a motorized mechanical operator. After it reaches the closed position pneumatic operator 15 acts to hold the clamshell in the closed position against the force of the slightly overbalanced counterweight. While the chamber is in the closed position, inflatable seals, to be described later, are expanded and the pumping sequence actuated so as to evacuate the chamber. After evacuation of the chamber, the force of the atmosphere retains the clamshell in the closed position and the operator 15 becomes ineffective and is deactivated. By means of the clamshell structure shown here, and through the use of the sectional modular construction which will be described below, it is possible to produce extremely large vacuum chambers which give complete access to the inside of the vacuum chamber so that the large parts may be handled by an overhead crane which can be utilized to deposit the parts onto the work table which is mounted on the floor of the chamber.

Figure 2:
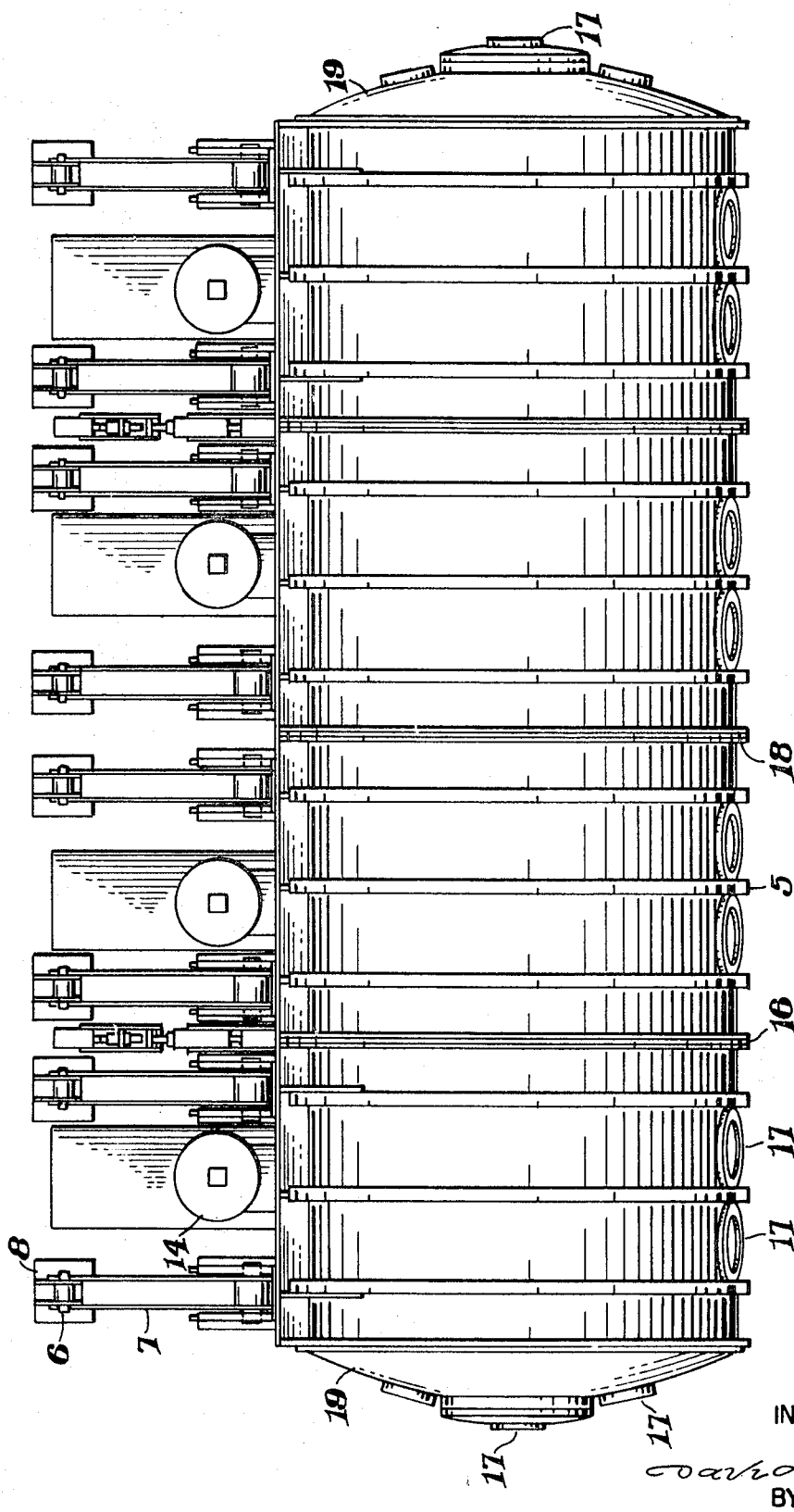
FIG. 2 is a plan view of an electron beam welding chamber in accordance with the present invention.

FIG. 2 is a plan view of the electron beam welding chamber which indicates the manner in which several similar sections may be fastened together in order to form a structure as large as is required to handle a given set of parts which are to be electron beam welded. Each modular section is constructed in the form shown in FIG. 1 from a plate rolled to the proper shape which later has welded to it three ribs 5, between which two viewing ports 17 are situated, and flanges 18 at both ends of the clamshell module. The several modules may be fastened together at the joints 16 by bolts or other suitable fastening means so as to form the complete structure. The end bells 19 are fastened to the two outer flanges of the fabricated assembly. Each module is fabricated with two supports 7 for holding counterweights 8 and pivoting means 6. The structure may be assembled with as many modules as is necessary and if, at a later date, it is found that larger structures must be electron beam welded it is possible to add the required number of modules to the existing structure so that the larger parts may be accommodated within the vacuum chamber. In assembling the structure, it is necessary to seal the joints 16 so that air from the atmosphere outside the chamber may not enter the chamber through the joints 16. The manner in which this is accomplished is illustrated in FIG. 4.

Figure 3:
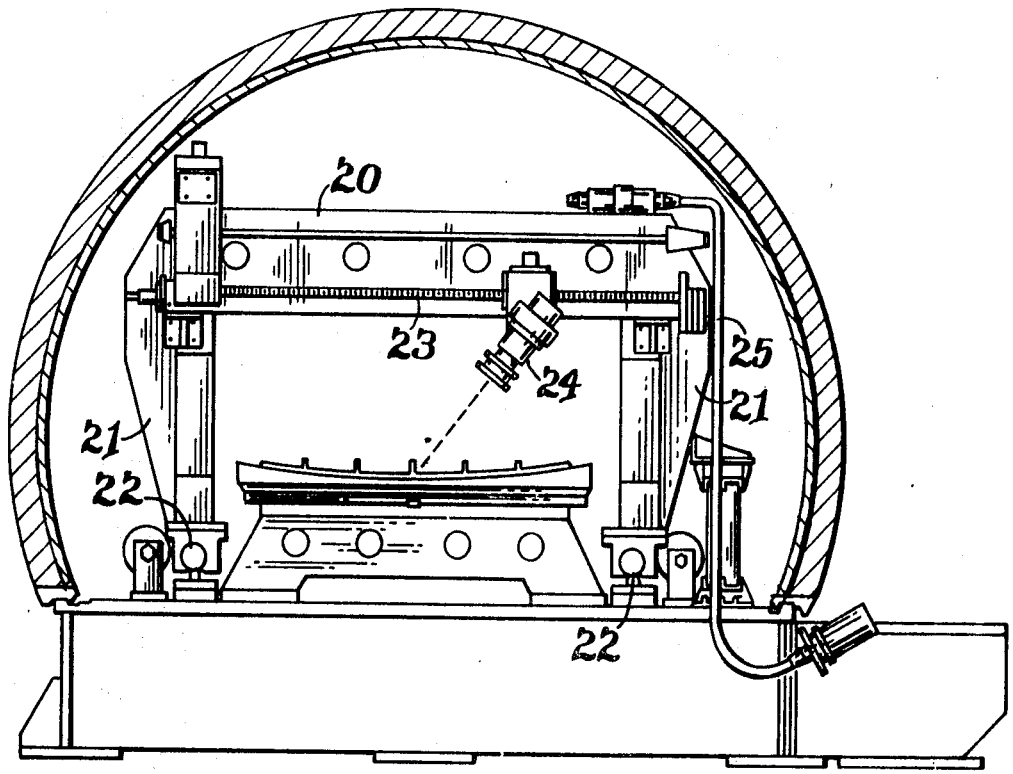
FIG. 3 is a section taken from the side view of the invention showing a gantry, an electron gun and a work-holding carriage in place within the chamber.

FIG. 3 is a section taken from the side of the chamber which shows the gantry in position on the floor of the chamber. The gantry 20 is mounted by its legs 21 on a ball screw mechanism 22 which is motorized and operated so as to move and position the gantry lengthwise through the chamber from one end to the other. A gun carriage 23 is mounted upon the gantry and is equipped with a ball screw mechanism by which means the electron beam gun 24 is caused to move transversely across the chamber. A high-voltage cable 25 carries the necessary current from the high-voltage power supply outside the chamber through a high-voltage feedthrough into the chamber.

Figure 4:
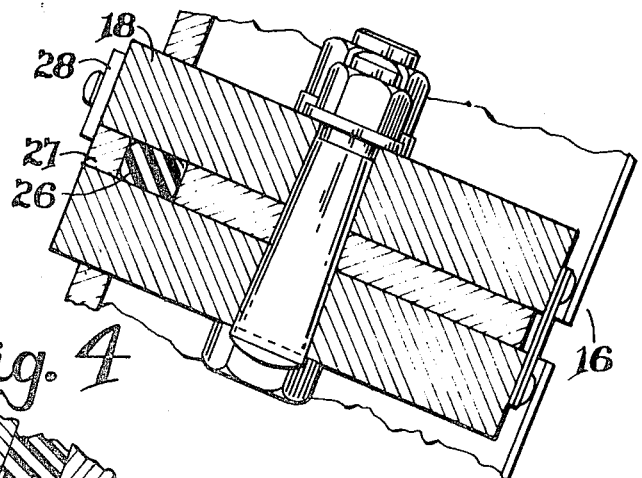
FIG. 4 is a section showing the arrangement of the seals between two of the sections from which the chamber is assembled.

FIG. 4 is a detail showing the means used for sealing the joints 16 between the flanges 18 of the two adjacent modules which are fastened together. The continuous seal fabricated of rubber or some other suitable material is forced between the open space between the flanges 18. A series of retaining segments 27 are introduced into the space between the seal and the edge of the flanges and are held in place by means of retaining plates 28. The retaining segments 27 and retaining plates 28 prevent the seal 26 from being forced into the vacuum chamber under the action of the atmospheric pressure which is exerted on the surface of the seal which is exposed to the outer atmosphere.

FIG. 5 illustrates the means by which the edge of the clamshell is sealed to the floor plates of the vacuum chamber and shows also how the sealing is effected between floor plate modules and how the seal is carried across the gap between the joint between the modules. The resilient seal 26 is cemented to the bridging plate 29, which is inserted between the connecting flanges of the separate modules, by means of a cement 43 which remains in a flexible condition. The bridging plate 29 is, at the same time, cemented to the inner surfaces of the adjacent flanges so that a smooth sealing surface is thus created along the sealing edge 30 of the assembled clamshell structure. Similar bridging arrangements are made at all the joints so that the edge 30 presents a clean, unbroken, smooth, continuous surface around the edge of the clamshell structure. To this surface is attached seal support 31 made up of a series of segments whose edges are cemented together so as to form a continuous channel 38 which supports resilient seal 32 which effects a seal between seal support 31 and sealing surface 30. Seal support 31 has built into it a second channel which retains the upper resilient seal 34. The floor plate modules are fastened to each other by means of flanges and sealed one against the other. In a similar manner resilient seal 36 is inserted between the adjacent flanges of adjoining floor plate modules. Bridging member 37 is inserted between the floor plates. The square end of the resilient seal 36 is cemented to the bridging member and the bridging member is cemented to both edges of the adjoining plates. Sealing surface 39 is provided on the bridging member and lies in the same plane as the sealing surfaces machined on the floor plates. With the bridging member cemented to the adjoining floor plates a smooth unbroken sealing surface is realized around the edge of the assembled floor plates. Seal retainer 40 is a continuous structure placed close to the edges of the complete assembly of base plate modules. It may be constructed from a series of segments cemented end to end. Holes 41 are drilled into the ends of each segment and are filled with epoxy cementing material 43 so as to form virtual pegs. A flexible endless seal 35 is installed in a channel formed in the seal plate and effectively seals the sealing surface 39 around the edge of the base plate. An inflatable pneumatic endless seal is installed in the seal retainer socket 42. This seal is inflated and deflated through a suitable port leading to the atmosphere from the inside of the seal. When the vacuum chamber is open or exposed to the outside atmosphere the seal 33 is in the position shown. When air under pressure is caused to enter through the port into the inside of the inflatable seal 33 its serrated sealing surface makes contact with the surface of upper seal 34 effectively sealing the clamshell to the base so that the chamber may be evacuated.

The invention is not limited to the form of the structure shown in the accompanying drawings but may include also other forms which may become apparent to those of skill in the art.

What is claimed is:

1. An electron beam welding machine comprising a vacuum chamber which completely encloses workpieces to be welded and an electron gun supported on a gantry which has means for translating the said electron beam gun along paths parallel to three axes which are mutually perpendicular to each other, the said vacuum chamber consisting of a floor plate, upon which the said gantry may be translated and upon which the workpieces and fixtures for said workpieces may be mounted, which is provided with means about its periphery defining a continuous sealing surface close to the edges of its upper surface, and a clamshell cover provided with a continuous sealing lip along the edges of its opening, the said floor plate and clamshell each being assembled from modular sections which carry flanges at their two opposite sides which adjoin like modular sections and whose adjoining surfaces are sealed by sealing means disposed between the adjoining modular sections, said sealing means comprising resilient seals installed between adjacent flanges and auxiliary bridging members cemented to the ends of adjacent flanges to which the ends of the said resilient seals are cemented so as to effect a vacuumtight seal between the said adjacent flanges and provide a continuous sealing surface from flange to flange along the sealing edge of the assembled modular sections, hinging means to allow the said clamshell cover to be angularly displaced about a horizontal axis which runs parallel to the length of the said clamshell along a line outside the outer surface of the clamshell and close to one of the edges at its opening so as to give access to gantry and workpieces, inflatable endless seal means on said peripheral sealing means to seal the lip of the opening of the clamshell cover to the said floor plate so as to effect a vacuum tight seal between the two parts, and means for evacuating the space enclosed by the floor plate and the clamshell from below the floor plate through openings in the said floor plate.

2. An electron beam welding machine as per claim 1 comprising a tooling bed plate forming the floor of said chamber, and means for obtaining unobstructed access to the tooling bed plate from above and from all sides of the said tooling bed plate.

3. An apparatus as in claim 1 in which the said means to seal the lip of the opening of the clamshell cover to the floor plate includes the said inflatable endless seal means, means for retaining the said inflatable endless seal, means for sealing the said retaining means to the smooth unbroken sealing surface around the edge of the aforementioned floor plate and means for inflating the said inflatable seal means.

4. An apparatus as in claim 2, in which the means for obtaining unobstructed access to the tooling bed plate comprises a rigid tool bed plate upon which the work and tooling may be mounted and a clamshell cover structure for covering the said tooling bed plate, pivot means in spaced relation to one edge of said clamshell structure and about which clamshell may rotate about a horizontal axis so as to make accessible the said tooling bed plate and counterweight means for balancing said clamshell structure.

5. An apparatus as in claim 4 in which the said tooling bed plate and clamshell structure respectively are constructed of several flat and several semicircular modular sections joined together end to end by flanges, including means for closing the ends of the clamshell, means for effecting a vacuumtight seal at the joints between each joined section, and means for effecting a continuous sealing surface along the open edge of the clamshell structure.

6. An apparatus as in claim 4 in which each of the said modular sections is provided with supports for holding the said counterweight means.